United States Patent [19]

Saito et al.

[11] Patent Number: 4,729,627
[45] Date of Patent: Mar. 8, 1988

[54] OPTICAL FIBER CABLE FOR DETECTING LOW TEMPERATURE

[75] Inventors: Yasunori Saito; Osamu Ichikawa, both of Yokohama, Japan

[73] Assignee: Sumitomo Electric Industries, Ltd., Osaka, Japan

[21] Appl. No.: 640,093

[22] Filed: Aug. 13, 1984

[30] Foreign Application Priority Data

Aug. 15, 1983 [JP] Japan ............................ 58-126253[U]
Aug. 15, 1983 [JP] Japan ............................ 58-126254[U]

[51] Int. Cl.⁴ .................. G02B 6/44; H01J 5/16
[52] U.S. Cl. ...................... 350/96.23; 350/96.29
[58] Field of Search ............. 350/96.23, 96.30, 96.31, 350/96.29, 96.32, 96.33, 96.34, 96.10; 250/227

[56] References Cited

U.S. PATENT DOCUMENTS

| | | | |
|---|---|---|---|
| 4,417,782 | 11/1983 | Clarke et al. | 350/96.29 |
| 4,491,386 | 1/1985 | Negishi et al. | 350/96.23 |
| 4,505,542 | 3/1985 | Clarke | 350/96.33 |
| 4,515,435 | 5/1985 | Anderson | 350/96.23 |
| 4,530,078 | 7/1985 | Lagakos et al. | 350/96.29 |
| 4,596,443 | 6/1986 | Diemeer et al. | 350/96.23 |
| 4,654,520 | 3/1987 | Griffiths | 250/227 |
| 4,678,903 | 7/1987 | Wlodarczyk et al. | 250/227 |

FOREIGN PATENT DOCUMENTS 2082790 3/1982 United Kingdom ............ 350/96.23

Primary Examiner—John Lee
Assistant Examiner—Brian M. Healy
Attorney, Agent, or Firm—Cushman, Darby & Cushman

[57] ABSTRACT

An optical fiber cable for detecting a low temperature comprising a center member made of a material having a low coefficient of linear expansion and one or more longitudinally extending grooves in each of which at least one optical fiber is placed, (i) wherein at least one optical fiber comprising a core and a cladding both made of silica glass is placed in each of said grooves and the interior space of the groove which is not occupied by the optical fiber or fibers may be filled with a resin which has a low glass transition temperature; or (ii) wherein each of the optical fibers placed in each of said grooves, have different coating structures from each other and/or different fiber structures from each other so as to detect a low temperature in different temperature ranges.

14 Claims, 7 Drawing Figures

OPTICAL FIBER CABLE FOR DETECTING LOW TEMPERATURE

FIELD OF THE INVENTION

The present invention relates to an optical fiber cable having an improved structure useful for continuous detection of a low temperature over a broad temperature range along the longitudinal direction of the fiber.

BACKGROUND OF THE INVENTION

In the prior art an optical fiber for continuously detecting a low temperature rapidly detects a low temperature of a chilled fluid with accuracy along in its longitudinal direction. Such an optical fiber apparatus is particularly useful in fuel storage facilities, for it is a noteworthy safe low temperature detecting means that will not cause an explosion due to its complete insulation against the environment.

A conventional method for detecting a low temperature with an optical fiber comprises detecting variation of attenuation through the optical fiber in proportion to temperature change by a so-called back scattering method which measures back scattering of light transmitted through the optical fiber. Such variation of attenuation corresponding to temperature change may be caused by change of difference between refractive indexes of a core and a cladding depending on temperature change or by microbending of the optical fiber resulting from shrinkage of a coating material of the optical fiber due to temperature change. In order to improve sensitivity of such a low temperature detecting means, it is necessary to amplify change of attenuation corresponding to temperature change within an intended temperature range. However, acceptable variation of attenuation is only about several tens dB/Km at most since a requisite strength of light to be transmitted has its own lower limit, which inevitably limits the detectable temperature range. Accordingly, it is difficult for the conventional optical fibers to detect the variation of attenuation over a wide temperature range, and a detecting system including the conventional optical fiber tends to malfunction.

A generally known optical fiber through which attenuation varies with temperature change includes a plastic cladding optical fiber (hereinafter referred to as "PCF"). PCF consists of a core made of silica glass and a cladding made of a silicone resin. Reference is made to FIG. 1 to explain functions of PCF. In FIG. 1, silica glass as a core shows a stable refractive index against temperature changes (Line A) whereas, the refractive index of the silicone resin varies with temperature (Line B). Therefore, the difference between refractive indexes of the core and the cladding is decreased or even becomes negative as the temperature of PCF becomes lower. Thus, the strength of light transmitted is reduced corresponding to the decrease of the difference between the refractive indexes which results from temperature lowering.

However, PCF unavoidably encounters a temperature at which PCF becomes incapable of transmitting light, namely, a temperature at which the refractive index of the core becomes smaller than that of the cladding so that light is not transmitted. In order to lower said temperature, a material having a low refractive index at room temperature, such as a silicone resin, should be used as a cladding material, but such an optical fiber is accompanied by an increased Rayleigh scattering and brings about an undesirable problem in that attenuation becomes too great.

OBJECT AND SUMMARY OF THE INVENTION

Accordingly, an object of the present invention is to overcome the above-described drawbacks of the conventional optical fiber for detecting a low temperature and to provide an optical fiber cable capable of precisely detecting a low temperature over a wide temperature range.

Another object of the present invention is to provide an optical fiber cable capable of detecting a low temperature with high accuracy over a wide temperature range comprising at least two optical fibers which detect a low temperature in a different temperature range.

According to the present invention, optical fibers are preferably placed in longitudinally extending grooves of a center member comprising a material having a low coefficient of linear expansion, such as metals (e.g. aluminium, stainless steel, copper, etc.) and non-metallic materials (e.g. fiber-reinforced plastics (FRP) which are reinforced, for example, by glass fibers, carbon fibers or Aramid fibers). When the center member is made of a metal, detection with quick response is possible because of their good thermal conductivity. On the other hand, the center member made of the non-metallic material affords a completely non-metallic optical fiber cable which is free from explosion problems when used for detecting temperature in fuel storage facilities.

According to one embodiment of the present invention, there is provided an optical fiber cable for detecting a low temperature comprising a center member whose outer surface has at least one longitudinally extending groove containing therein at least one optical fiber. The optical fiber comprises a core and a cladding both made of silica glass. The center member is made of a material having a low coefficient of linear expansion, and the interior space of the grooves which is not occupied by the optical fiber or fibers is filled with a resin which has a low glass transition temperature, such as silicone resins and acrylic resins. The center member has a covering such as a protecting pipe made of aluminium, stainless steel, copper or a fluorocarbon polymer, etc. It is preferred to place only one optical fiber in each groove of the center member. When a plurality of optical fibers are placed in one groove, the fibers are separated from each other with a filling (e.g. resins) in order to enable the individual fiber fully to exert its characteristics intact.

According to another embodiment of the present invention, there is provided an optical fiber cable for detecting a low temperature comprising a center member whose outer surface has at least two longitudinally extending grooves in each of which one optical fiber is placed, wherein the center member is made of a material having a low coefficient of linear expansion such as a metal (e.g. aluminium, stainless steel, copper, etc.). Each of the optical fibers placed in each groove detects a low temperature in a different temperature range. The periphery of a center member is covered with the protecting covering as in the first embodiment of the invention.

The size of the center member is preferably from 2 to 6 mm or more preferably from 3 to 5 mm, but particularly about 4 mm.

The grooves preferably extend helically around the surface of the center member. Pitch of the helical groove is at least 0.1 m, preferably from 0.1 to 1 m. However, they may extend parallel with the axis of the center member. The number of the grooves is at least one, preferably at least three. The cross section of the groove may be any form that can contain the optical fiber and is preferably of a U-shape or V-shape. The size of the groove may vary with the size of the optical fiber to be contained.

DETAILED DESCRIPTION OF THE INVENTION

The first embodiment of the present invention will be illustrated in greater detail with reference to FIG. 2.

Figure 1:
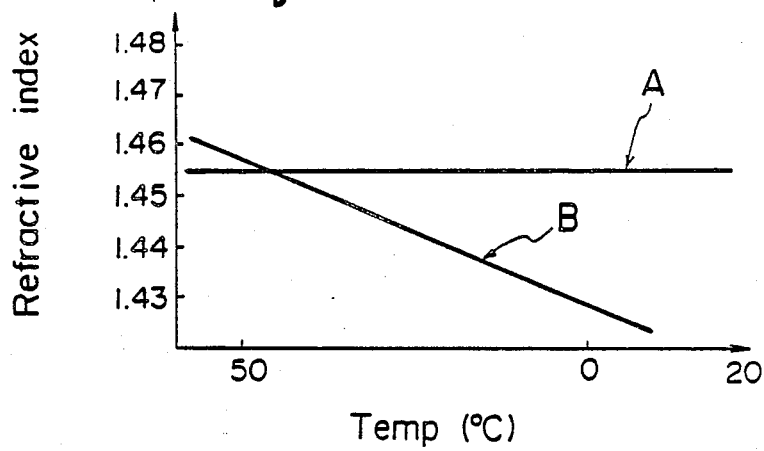
FIG. 1 is a graph showing temperature characteristics of refractive indexes of silica glass and a silicone resin of the prior art.
Figure 2:
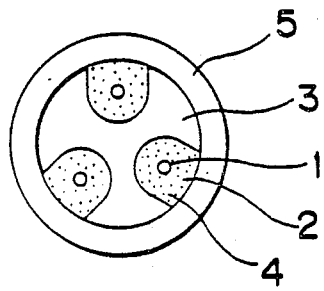
FIGS. 2 and 3 show cross-sectional views of two different embodiments of the optical fiber cables of the present invention.

In FIG. 2, at least one (preferably one) optical fiber 1 having an outer diameter of about 100 to 200 micrometers and consisting of a core and a cladding both made of glass is placed in each of the three U-shaped grooves 2 (1 mm depth, 1 mm width), which are helically provided in the peripheral surface of a spacer 3 (center member). The spacer is made of aluminum, copper or FRP and has a diameter of about 4 mm. The interior of each groove 2 which is not occupied by the optical fiber is filled with a silicone resin 4. The periphery of the spacer 3 is covered with a pipe 5 made of aluminium, stainless steel, copper, a fluorocarbon polymer, etc.

Figure 4:
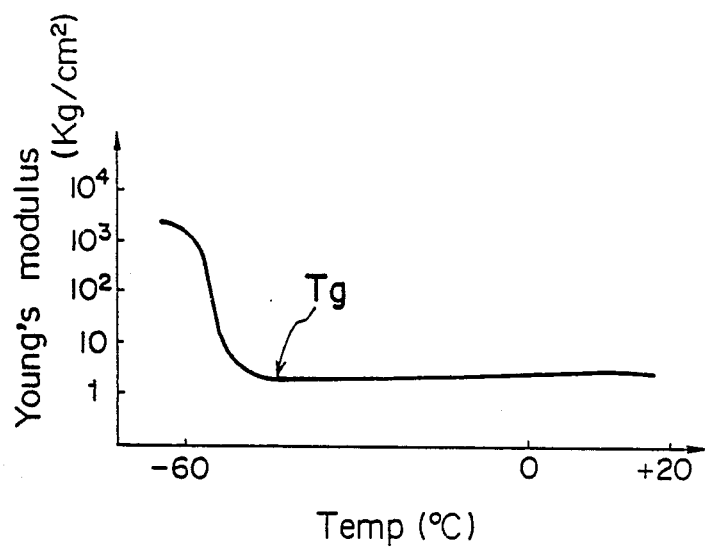
FIG. 4 is a graph showing a relation between Young's modulus of a silicone resin and temperature.

While the silicone resin has a low Young's modulus at room temperature and exerts a cushioning effect, it has a low glass transition temperature so that it has a large Young's modulus at a low temperature as shown in the graph of FIG. 4, thereby causing microbending of the optical fiber. When the optical fiber is cooled to a low temperature, attenuation increases due to microbending, and thereby said low temperature is detected. Accordingly, the optical fiber for detecting a low temperature can be formed by coating the optical fiber with a resin which has low glass transition temperatures such as silicone resins or acrylic resins.

Figure 5:
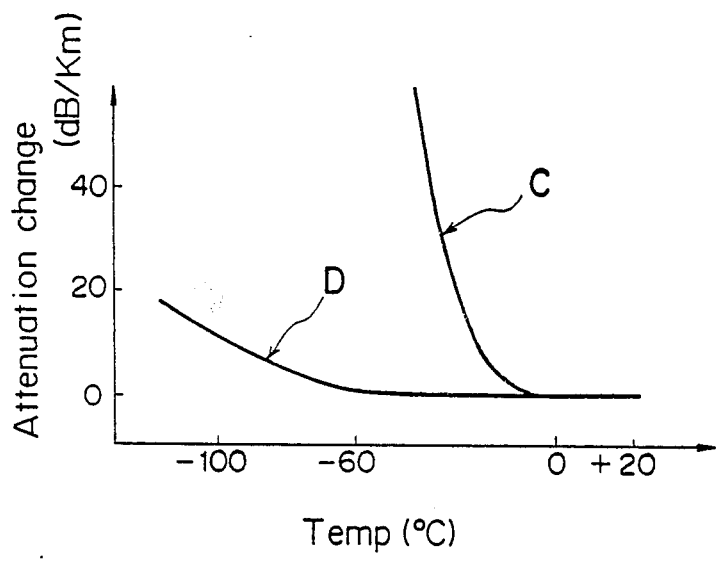
FIG. 5 is a graph showing temperature detecting characteristics of a conventional optical fiber and the optical fiber of the invention.

A conventional optical fiber in which microbending is caused upon exposure to a low temperature generally comprises a core-cladding structure made of glass (i.e. a glass optical fiber) having coated thereon silicone resin and nylon. Such a conventional optical fiber cannot be used as a sensor at a temperature lower than $-60°$ C. as shown by Curve C in the graph of FIG. 5. However, in case of the glass fiber having only the silicone resin coating, attenuation is increased by 10 dB/Km even at $-100°$ C. as shown by Curve D of FIG. 5. Thus, according to the present invention, it is possible to detect a low temperature as low as $-100°$ C. by causing microbending of the optical fiber and making use of low temperature characteristics of the silicone resin.

Figure 6:
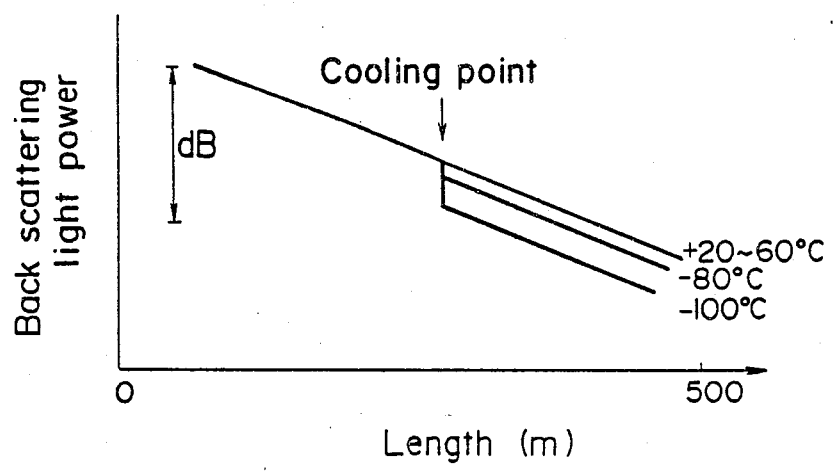
FIG. 6 is a graph showing position detecting characteristics of the optical fiber cable shown in FIG. 2.

FIG. 6 illustrates temperature characteristics as a function of detecting position exposed to a low temperature when the middle part of the optical fiber cable of the first embodiment of the present invention was cooled over a length of about 20 meters. According to FIG. 6, no change in attenuation loss was observed when cooled to a temperature of from $+20°$ C. to $-60°$ C., but a change of the attenuation transmission by about 0.3 dB was detected when cooled to $-100°$ C. It was found, therefore, that the optical fiber cable of the invention effectively detects a low temperature of about $-80°$ C. to $-100°$ C. or even lower. Further, according to this embodiment, it is not necessary to increase the difference between the refractive indexes of the core and the cladding in case of PCF to lower the detectable temperature range therefore, a silica glass optical fiber having a standard structure can be employed for detecting a low temperature.

Silicone resin-coated optical fibers generally require protection because of their weakness against lateral pressure. According to the present invention, this problem can be solved by placing the optical fiber in the groove of the center member. Further, in the prior art devices, shrinkage of the center member at a low temperature may deteriorate the low temperature detectability of the optical fiber however, shrinkage can be prevented by using as the center member a material having a smaller coefficient of linear expansion than that of the silicone resin, such as a metal (e.g. aluminium, stainless steel or copper) or FRP. Furthermore, when the center member is made of a metal having excellent thermal conductivity as well as a low coefficient of linear expansion, thermal conductivity and response for low temperature detection are improved.

In the above-described second embodiment of the invention, the term "optical fibers having different coating structures" is intended to mean optical fibers having applied thereto a single or multi-layered coating which has different combinations of the coating material(s), the properties and/or thickness of the coating layer(s), the state of coating, etc. Such optical fibers include, for example, an optical fiber consisting of a core and a cladding both made of silica glass having applied thereto a primary single or multi-layered coating. The same optical fiber may have further applied thereon a secondary coating for protection and a plastic cladding fiber (PCF) consisting of a core made of silica glass and a cladding made of a plastic. PCF or the glass optical fiber having the primary coating can be formed by applying polyimide resins, silicone resins or acrylic resins onto the silica glass optical fiber and hardening the resin with ultraviolet rays or heat in the step of drawing the silica optical fiber. The secondary coating is applied onto the primary coating directly or with a space therebetween. The resins to be used as the secondary coating include thermoplastic resins (e.g. polyamide, polypropylene, fluororesins, etc.) and FRP. Even if the primary and the secondary coatings have the same coating structure, the shrinkage rate of the optical fiber at a low temperature can vary when resins having different physical properties are used or when shrinkage strain of the optical fiber resulting from shrinkage of the coatings after extrusion is changed. In such a manner, the detectable temperature range of the optical fiber can be varied. The detectable temperature range may also vary when the outer diameter and/or refractive index profile of the silica glass fiber is changed.

The second embodiment of the invention will be illustrated in greater detail with reference to FIG. 3.

Figure 3:
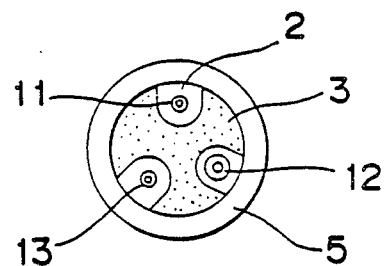

In FIG. 3, a silicone resin-coated optical fiber 11, an optical fiber 12 formed by further coating the above silicone resin-coated optical fiber with tetrafluoroethyleneperfluoroalkylvinylether copolymer (PFA), and an acrylic resin-coated optical fiber 13 are respectively placed in each of three U-shaped grooves 2 (1 mm depth, 1 mm width) which are laterally and helically provided in the periphery of a spacer 3 made of aluminium, stainless steel, copper or FRP and having a diameter of about 4 mm. The spacer 3 containing therein the optical fibers 11, 12 and 13 is covered with a pipe 5 made of aluminium, stainless steel, copper or a fluorocarbon polymer. The above-described fibers have an outer diameter of about 100 to 200 micrometers. The physical properties of the coating resins and the glass used in the optical fibers 11, 12 and 13 are shown in Table 1 below.

TABLE 1

| Material | Glass transition temp. (°C.) | Coefficient of linear expansion ($\times 10^{-4}$/°C., at 20° C.) | Young's Modulus (Kg/mm$^2$, at 20° C.) |
|---|---|---|---|
| Silicone resin | −46 | 2 | 0.1 |
| Acrylic resin | −7 | 2 | 40 |
| PFA | — | 1 | 40 |
| Glass (fiber) | — | 0.006 | 7.3 × 10$^3$ |

The optical fiber cable of the second embodiment of the present invention comprises the optical fibers having different detectable temperature ranges which have been employed individually so that it is possible to detect a low temperature in a broader temperature range than the individual fiber.

Figure 7:
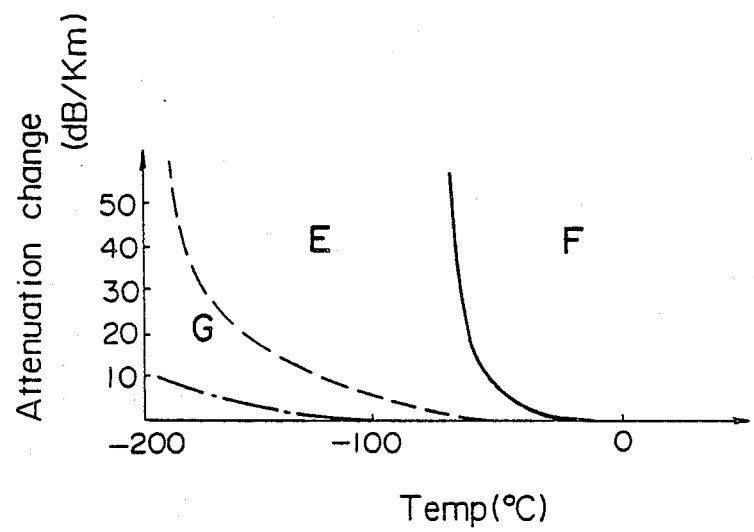
FIG. 7 is a graph showing temperature detecting characteristics of the optical fiber cable shown in FIG. 3.

FIG. 7 shows low temperature detectability characteristics of the optical fiber cable according to the second embodiment of the present invention, wherein Curves E, F and G indicate temperature characteristics of the optical fibers 11, 12 and 13, respectively. As far as the individual fiber is concerned, since a range from a temperature at which attenuation begins to increase to a temperature at which attenuation drastically increases is restricted, the detectable temperature range is narrowly limited. However, when the different optical fibers are contained in one single cable so as to overlap the respective detectable temperature ranges, the resulting cable can be applied to a broadened temperature range of from about −30° C. to −200° C. Further, since only each one of the different optical fibers is placed in each of the grooves of the spacer, the respective low temperature detectability can be retained without any influence from other fibers, and influences from outside the cable can be shielded by the spacer. Furthermore, use of various optical fibers each having a different applicable temperature range makes it possible to conduct cross checking of the sensor fibers and to monitor any malfunctioning of the optical fibers.

In addition, use of a metal having excellent thermal conductivity as well as a lower coefficient of linear expansion than that of the coating resins of optical fibers as a material for the spacer and of the protecting covering reduces time delay of temperature detection, alleviates the influence of the shrinkage of the spacer, and thus preserves the characteristics of the fiber.

While the present invention has been described in detail and with reference to specific embodiments thereof, it will be apparent to one skilled in the art that various changes and modifications can be made therein without departing from the spirit and scope thereof.

What is claimed is:

1. An optical fiber cable for detecting a low temperature, comprising:
   a center member having a longitudinally extending groove in the outer surface thereof, said center member being made of a material having a low coefficient of linear expansion;
   an optical fiber, contained in said groove, said optical fiber including a core and a cladding about said core, both said core and said cladding being made of silica glass;
   a resin having a low glass transition temperature filling in the interior space of said groove not occupied by said optical fiber, said resin being in direct contact with said cladding such that changes in the physical properties of the resin due to temperature induce microbending in the optical fiber, thereby altering optical characteristics of said fiber; and
   a protective covering surrounding the periphery of said center member containing said optical fiber and said resin.

2. An optical fiber cable as claimed in claim 1, wherein the groove helically extends around the outer surface of the center member.

3. An optical fiber cable as claimed in claim 1, wherein said center member is made of a metal selected from the group consisting of aluminium, stainless steel and copper.

4. An optical fiber cable as claimed in claim 1, wherein said center member is made of a non-metallic material selected from fiber-reinforced plastics.

5. An optical fiber cable as claimed in claim 1, wherein said resin filling the unoccupied interior space of the groove is selected from the group consisting of silicone resins and acrylic resins.

6. An optical fiber cable as claimed in claim 1, wherein the covering is a pipe made of a material selected from the group consisting of aluminum, stainless steel, copper and a fluorocarbon polymer.

7. An optical fiber cable for detecting a low temperature, comprising:
   a center member having at least two longitudinally extending grooves in the outer surface thereof, said center member being made of a material having a low coefficient of linear expansion;
   optical fibers, contained in each of said grooves, each of said optical fibers including a core and a cladding about said core, both said core and said cladding being made of silica glass such that each of said optical fibers has a different physical property at low temperatures than any of the other said optical fibers so that microbending of each of said optical fibers is affected differently by a low temperature in a different temperature range;
   a resin having a low glass transition temperature filling in the interior space of said grooves not occupied by said optical fibers; and
   a protective covering surrounding the periphery of said center member containing said optical fibers and said resin.

8. An optical fiber cable as claimed in claim 7, wherein said optical fibers have different coating structures from each other.

9. An optical fiber cable is claimed in claim 7, wherein the outer diameters of said optical fibers are different from each other.

10. An optical fiber cable as claimed in claim 7, wherein the grooves helically extend around the outer surface of the center member.

11. An optical fiber cable as claimed in claim 7, wherein said center member is made of a metal selected from the group consisting of aluminium, stainless steel and copper.

12. An optical fiber cable as claimed in claim 7, wherein the covering is a pipe made of a material selected from the group consisting of aluminum, stainless steel, copper and a fluorocarbon polymer.

13. An optical fiber cable as claimed in claim 7, wherein said center member is made of a non-metallic material selected from fiber-reinforced plastics.

14. An optical fiber cable as claimed in claim 7, wherein the refractive index profiles of said optical fibers are different from each other.

* * * * *